Oct. 25, 1955 F. S. SCHINDLER 2,721,746
TURBULENCE PREVENTING OFFSET AXIAL EXPANSION JOINT
Filed June 28, 1951
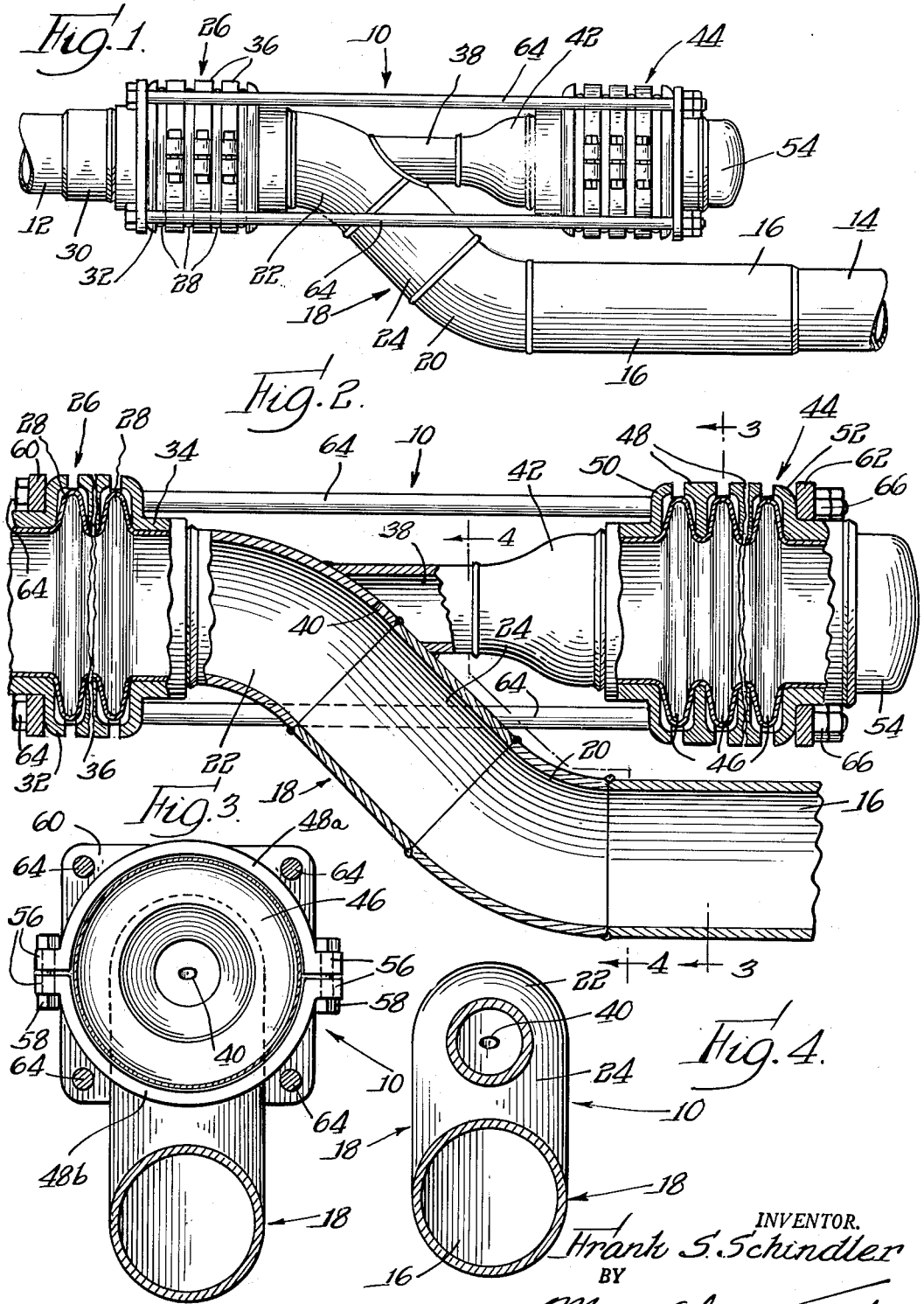
INVENTOR.
Frank S. Schindler
BY
Moore, Olson & Tredler
attys.

United States Patent Office 2,721,746
Patented Oct. 25, 1955

2,721,746

TURBULENCE PREVENTING OFFSET AXIAL EXPANSION JOINT

Frank S. Schindler, Elgin, Ill., assignor to Chicago Metal Hose Corporation, Maywood, Ill., a corporation of Illinois Application June 28, 1951, Serial No. 234,027

6 Claims. (Cl. 285—90)

This invention is concerned generally with joints for pipes and more particularly with a turbulence preventing offset axial expansion joint.

One of the most common difficulties experienced with pipes or other conduits carrying heated fluids is that the linear dimensions of the pipes vary with temperature. Pipes or other conduits generally are installed at the ambient air temperature and tend to become elongated when fluids of high temperature are conveyed through them. The forces tending to elongate the pipe are considerable, and if a rigid and rigidly supported pipe is utilized, it is quite likely to buckle.

Various expansion joints have been devised for insertion in pipes or conduits to take up the axial expansion of the pipes with increasing temperature and under the influence of other factors. The most satisfactory of such joints heretofore devised have utilized corrugated metal bellows capable of compression and extension axially to accommodate the elongation of the pipes or conduits in which they are inserted.

Considerable internal pressures often are encountered and such pressures tend to separate pipe joints, including axial expansion pipe joints such as those utilizing corrugated metal bellows. Heretofore the end thrust engendered by internal fluid pressure generally has been resisted by heavy anchors secured to the pipe ends adjacent the expansion joint and fixedly mounted, or by compensated joints which have not been wholly satisfactory.

It therefore is an object of this invention to provide a new or improved self-contained axial expansion joint of the corrugated metal bellows type capable of resisting the end thrust of internal fluid pressure.

A further object of this invention is to provide an axial expansion joint of the corrugated metal bellows type having oppositely extending, parallel end sections adapted for attachment to adjacent pipes or conduits.

Another object of this invention is to provide an axial expansion joint of the corrugated metal bellows type capable of withstanding very high internal pressures.

This invention contemplates the provision of a self-contained axial expansion joint having a bend, elbow or offset intermediate its ends with a corrugated metal bellows incorporated in the joint adjacent the offset. An extending pipe section incorporating a metal bellows extends from the offset in axial alignment with the heretofore mentioned bellows. Opposite ends of the two bellows are interconnected by tie rods so that the internal pressures developed in the two bellows counteract one another and no axial thrust is imparted to the adjacent pipes.

Another object of this invention is to provide a balanced expansion joint as outlined in the preceding paragraph wherein only a small orifice is provided for communication of the balancing bellows with the remainder of the joint whereby to eliminate turbulence at the bend or offset.

A further object of this invention is to provide a balancing axial expansion joint substantially as set forth in the second paragraph above wherein the balancing bellows is interconnected with the remainder of the joint by a pipe of comparatively small diameter, thus facilitating assembly and affording an economical construction.

Other and further objects and advantages of the present invention will be apparent from the following description when taken in connection with the accompanying drawing wherein:

Fig. 1 is an elevational view of a pipe joint embodying the principles of my invention;

Fig. 2 is a longitudinal sectional view of the pipe joint on an enlarged scale;

Fig. 3 is a cross sectional view taken along the line 3—3 of Fig. 2; and

Fig. 4 is a cross-sectional view taken along the line 4—4 of Fig. 2.

Referring now in greater particularity to the drawings, my pipe joint generally designated by the numeral 10 is shown connected between adjacent sections 12 and 14 of a pipe or conduit by conventional means such as sleeves, clamps or welding. The expansion joint 10 includes a straight end section 16 and an offset 18 formed by welding together two elbows 20 and 22 and a straight intermediate pipe section 24. A corrugated metal bellows 26 is secured to the end of the offset 18 opposite the end section 16 by suitable fluid-tight means such as welding.

The metal bellows 26, as best may be seen in Fig. 2, comprises a metallic cylinder or tubular wall having a plurality of parallel annular corrugations 28 resilient and yieldable so as to be capable of expansion and contraction under varying internal pressures. The bellows wall may be formed of a plurality of interfitted concentric metal tubes, so as to provide multi-ply wall structure of utmost flexibility. Such multi-ply wall construction is not absolutely necessary, however, as a single thickness wall structure may be used. The outer end of the tubular wall is secured by welding or other suitable means to a pipe coupling section 30 and an end reinforcing ring 32 encircles the bellows at this point and is in embracing relation with the bellows wall. The end reinforcing ring 32 likewise may be welded to the bellows wall. A similar end reinforcing ring 34 embraces the bellows wall at the inner end and the end reinforcing member and bellows wall are secured to the pipe elbow 22 by suitable fluid-tight means such as welding. A plurality of intermediate reinforcing rings 36, one for each corrugation, lies about the bellows wall or tubing in embracing relation. The reinforcing rings 32, 34 and 36 enable the bellows to withstand extremely high internal pressures.

A relatively small pipe 38 is welded to the edge of the offset 18 in axial alignment with the bellows structure 26 and communicates with the interior of the offset by means of a restricted orifice 40. The pipe 38 is welded to a bell 42 and the other or larger end of the bell is welded to a compensating bellows structure generally identified by the numeral 44. The bellows structure 44 is quite similar to the bellows structure 26 and includes a side wall having a plurality of corrugations 46, reinforcing rings 48 and end reinforcing rings 50 and 52. The outer end of the bellows tube is welded to an end cap 54 which preferably also is welded to the end reinforcement ring 52. The reinforcing rings of both bellows structures may be of split construction comprising upper and lower halves or segments as illustrated at 48a and 48b in Fig. 3. The ring segments are provided with substantially radially extending ears 56 secured together by bolts 58. Alternatively, the rings may be of the type and may be applied as disclosed in the copending application of Frank S. Schindler and Richard K. Titus, Serial No. 8,116, filed February 13, 1948, and entitled "Reinforced Flexible Conduit and Method of Manufacture." As disclosed in that application, the rings are of integral annular construction, and are applied to the tubing prior to the corrugation thereof while the tubing is of cylindrical form. The rings are applied to the tubing in predetermined spaced relation after which hydraulic pressure is applied internally of the tubing so as to cause deformation of the tubing wall and the formation thereof into a series of annular corrugations, the integral rings acting as die members to control the forming operation. After the forming, the rings become permanently associated with the tubing in embracing relation with the several corrugations thereof.

A square end plate or retaining flange 60 surrounds the end reinforcement ring 32 on the expansion joint bellows and a similar end plate or retaining flange 62 surrounds the outer end of the end reinforcing ring 52 on the compensating bellows structure 44. Four tie rods 64 extend between corresponding corners of the plates or flanges 60 or 62 and are held in place by nuts 66 on the ends thereof.

The cross sections of the main expansion bellows 26 and of the compensating bellows 44 are identical and hence equal in area. End thrust developed by internal pressure within the bellows 26 thus is equal to end thrust developed within the bellows 44 and thrusts are transmitted through the tie rods 64 and through the elbow 22, pipe 38, and bell 42 to cancel one another. Consequently, the expansion bellows 26 does not tend to expand and force the pipe sections 12 and 14 apart due to internal pressure.

The axial expansion joint herein disclosed thus is compensated for end thrust due to internal pressure and is entirely self-contained. The parallel and oppositely extending connections or pipe ends of the joint facilitate attachment in a substantially straight flow pipe and the reinforcing rings on both the main expansion bellows and the compensating bellows adapt the joint herein disclosed for use with very high internal pressures. The small orifice communicating with the compensating bellows prevents turbulence at the bend or offset in the joint and the small diameter pipe communicating with the orifice facilitates welding to the offset section and reduces material costs.

It will be apparent that the specific embodiment disclosed is for illustrative purposes only and that various changes can be made within the spirit and scope of the invention as expressed in the following claims.

I claim:

1. An axial expansion joint comprising a first pipe connector, a flexible metal bellows connected to said first pipe connector, an offset pipe section connected to said bellows on the opposite end thereof from said first pipe connector, a second pipe connector on said offset pipe section, a conduit on said offset pipe section, a compensating flexible metal bellows on said conduit and axially aligned with the first mentioned bellows, the wall of said offset pipe section having restricted orifice means for providing fluid communication between the offset pipe section and the conduit while preventing turbulence in the offset pipe section, and tension means interconnecting opposite ends of said first mentioned flexible metal bellows and said compensating metal bellows whereby internal pressures in said two bellows counterbalance one another and preclude end thrust on said pipe connectors.

2. An axial expansion joint comprising a pipe connector, a flexible metal bellows connected to said pipe connector, an offset pipe section joined to said flexible metal bellows at the end thereof opposite said pipe connector, a compensating flexible metal bellows spaced from said first mentioned flexible bellows and axially aligned therewith, said pipe connector, said offset pipe section, and said two flexible metal bellows having substantially equal effective cross-sectional areas, a conduit of relatively small cross-sectional area connecting said compensating flexible metal bellows to said offset pipe section, the wall of said offset pipe section having restricted orifice means for providing fluid communication between the offset pipe section and the conduit while preventing turbulence in the offset pipe section, and tension means interconnecting opposite ends of said first mentioned flexible metal bellows and said compensating metal bellows whereby internal pressures in said two bellows counterbalance one another and preclude end thrust on said pipe connector and said offset pipe connector.

3. An axial expansion joint comprising a first pipe connector, a flexible metal bellows connected to said first pipe connector and axially aligned therewith, an offset pipe section, a second pipe connector on said offset pipe section extending oppositely to said first pipe connector and parallel thereto, a compensating flexible metal bellows spaced from said first mentioned flexible bellows and axially aligned therewith, said two pipe connectors, said offset pipe section, and said two flexible metal bellows, having substantially equal effective cross-sectional areas, a conduit of relatively small cross-sectional area extending between said offset pipe section and said compensating flexible metal bellows in axial alignment with both of said flexible metal bellows, orifice in the wall of said offset pipe section the wall of said offset pipe section having restricted orifice means for providing fluid communication between the offset pipe section and the conduit while preventing turbulence in the offset pipe section, and tension means interconnecting offset ends of said first mentioned flexible metal bellows and said compensating metal bellows whereby internal pressures in said two bellows counterbalance one another and preclude end thrust on said pipe connectors.

4. An axial expansion joint comprising a first pipe connector, a flexible metal bellows connected to said first pipe connector and axially aligned therewith, an offset pipe section, a second pipe connector on said offset pipe section extending oppositely to said first pipe connector and parallel thereto, a compensating flexible metal bellows spaced from the end of said first mentioned flexible bellows opposite said first pipe connector and axially aligned with said first mentioned bellows, both of said metal bellows being provided with axially spaced corrugations, a plurality of reinforcing rings encircling both of said metal bellows and interfitting with said corrugations, both of said pipe connectors, said offset pipe section, and both of said flexible metal bellows having substantially equal effective cross-sectional areas, a conduit of relatively small cross-sectional area interconnecting said compensating metal bellows and said offset pipe section and axially aligned with both of said bellows, the wall of said offset pipe section having restricted orifice means for providing fluid communication between the offset pipe section and the conduit while preventing turbulence in the offset pipe section, and means including a plurality of tie rods circumferentially spaced about both of said bellows and interconnecting the remotely disposed ends of said two bellows whereby internal pressures in said two bellows counterbalance one another and preclude end thrust on said pipe connectors.

5. An axial expansion joint for connecting generally parallel oppositely extending pipes, comprising a first pipe connector, a flexible metal bellows connected to said first pipe connector and axially aligned therewith, an offset pipe section connected with said flexible bellows and extending at an acute angle to the axis of said flexible bellows, a second pipe connector on said offset pipe section extending oppositely relative to said first pipe connector and substantially parallel thereto, a conduit extending from said offset pipe section oppositely to said first pipe connector and axially aligned therewith, a compensating flexible metal bellows on said conduit and axially aligned with said first mentioned flexible metal bellows, the wall of said offset pipe section having restricted orifice means for providing fluid communication between the offset pipe section and the conduit while preventing turbulence in the offset pipe section, and tension means interconnecting opposite ends of said first mentioned flexible bellows and said compensating metal bellows so that internal pressures in said two bellows counterbalance one another and preclude end thrust on said pipe connectors.

6. An axial expansion joint, comprising a first pipe connector, a flexible metal bellows connected to said first pipe connector and axially aligned therewith, an offset pipe section having one end thereof connected to said flexible bellows, a second pipe connector on said offset pipe section and extending oppositely relatively to said first pipe connector, a conduit having a diameter less than the diameter of said offset pipe section, a terminal end of said conduit being connected to the exterior surface of said offset pipe section and communicating with an intermediate portion of said offset pipe section and extending oppositely to and in axial alignment with said first pipe connector, a compensating flexible metal bellows on said conduit and axially aligned with said first mentioned flexible metal bellows, the wall of said offset pipe section having restricted orifice means for providing fluid communication between the offset pipe section and the conduit while preventing turbulence in the offset pipe section, and tension means interconnecting opposite ends of said first mentioned flexible bellows and said compensating metal bellows so that internal pressures in said two bellows counterbalance one another and preclude end thrust on said pipe connectors.

References Cited in the file of this patent

UNITED STATES PATENTS

| | | |
|---|---|---|
| 1,767,100 | Tannehill | June 24, 1930 |
| 2,344,424 | Singleton | Mar. 14, 1944 |
| 2,355,440 | Howard | Aug. 8, 1944 |
| 2,414,987 | Tobey | Jan. 28, 1947 |
| 2,548,788 | Helme | Apr. 10, 1951 |